US006997412B2

(12) United States Patent
Komiya

(10) Patent No.: US 6,997,412 B2
(45) Date of Patent: Feb. 14, 2006

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 39 days.

(21) Appl. No.: 10/877,693

(22) Filed: Jun. 26, 2004

(65) Prior Publication Data

US 2005/0040275 A1 Feb. 24, 2005

(30) Foreign Application Priority Data

Aug. 18, 2003 (JP) .............................. 2003-294393

(51) Int. Cl.
  *B65H 57/14* (2006.01)
  *F16G 13/00* (2006.01)
  *F16L 3/00* (2006.01)
(52) U.S. Cl. ...................... 242/615.2; 59/78.1; 59/900; 248/49
(58) Field of Classification Search ............ 242/615.2, 242/615.3, 397, 397.5, 548; 59/78, 78.1, 59/900; 248/49, 51, 78
  See application file for complete search history.

(56) References Cited

U.S. PATENT DOCUMENTS

| 3,664,619 A | * | 5/1972 | Heidrich et al. ............. 59/78.1 |
| 4,658,577 A | * | 4/1987 | Klein ........................... 59/78.1 |
| 4,800,714 A | * | 1/1989 | Moritz ......................... 59/78.1 |
| 4,833,876 A | * | 5/1989 | Kitao et al. .................. 59/78.1 |
| 5,174,104 A | * | 12/1992 | Wehler et al. ............... 59/78.1 |
| 5,724,803 A | * | 3/1998 | Pea ............................. 59/78.1 |
| 6,016,844 A | * | 1/2000 | Takahashi et al. ........... 59/78.1 |
| 6,730,850 B1 | * | 5/2004 | Tsutsumi et al. ............ 59/78.1 |
| 6,787,702 B1 | * | 9/2004 | Suzuki ........................ 59/78.1 |
| 6,864,425 B1 | * | 3/2005 | Ikeda et al. .................. 59/78.1 |
| 6,925,795 B1 | * | 8/2005 | Komiya ....................... 59/78.1 |
| 6,940,019 B1 | * | 9/2005 | Ikeda et al. .................. 59/78.1 |

FOREIGN PATENT DOCUMENTS

JP  2002-513896  5/2002

\* cited by examiner

*Primary Examiner*—William A. Rivera
(74) *Attorney, Agent, or Firm*—Woodling, Krost and Rust

(57) ABSTRACT

To provide a cable or the like protection and guide device, which can guide and move a cable or the like at high speed and at low noise between a link connection mode where the cable or the like is extended on one side and a link connection mode where the cable or the like is extended on the other side by folding it in a vertical plane of the cable or the like on said one side while centering a fixed end of the cable or the like, and can suppress wear of the link bodies, and in which the maintenance for par's exchanging and the like is easy. In a cable or the like protection and guide device, which protects and guides a cable or the like, any one pair of the respective slide retainers 13a of upper and lower opposed link bodies 10, 10 in a linear mode are biased toward link sides to be pushed out and the other pair of slide retainers 13a abut on the guide rails 14 to be pushed inside the link whereby the traveling rollers 13c, 13c provided in the guide traveling units 13, 13 of the upper and lower opposed link bodies 10, 10 in the linear mode can be traveled so as to pass each other.

4 Claims, 6 Drawing Sheets

CABLE OR THE LIKE PROTECTION AND GUIDE DEVICE

TECHNICAL FIELD

The present invention relates to a cable or the like protection and guide device, which accommodates a cable or the like composed of a flexible body such as a cable, a hose or the like, which supplies energy such as electric power, compressed air or the like to a movable machine, and can smoothly and reliably protect and guide the cable or the like even during the movement of the movable machine.

BACKGROUND TECHNOLOGY

As one example of a cable or the like protection and guide device for protecting and guiding a cable or the like composed of a flexible body such as a cable, a hose or the like, an energy guide chain for guiding a cable or a hose or the like has been known, which has a number of chain links composed of parallel band bodies articulately connected by lateral members, and can move so as to form a bending region an upper side link body, a lower link body and the two link bodies, and in which the upper side link body is placed on the lower side link body.

And such an energy guide chain can be moved at as small electric power as possible and at as low friction as possible while placing the upper side link body on the lower side link body. Further, to design an energy guide chain in as simple design as possible, rollers are provided in at least some of the chain link of the upper side link body and the lower side link body, and the rollers are adapted to roll on a traveling surface provided on a chain link of a link body on the opposed side during the movement of the energy guide chain.

Patent Reference 1: Publication of Japanese Patent No. 2002-513896 (on page 1, FIGS. 6 to 7).

Problems to be Solved by the Invention

However, in the conventional energy guide chain disclosed in the above-mentioned publication of Japanese patent No. 2000-513896, a roller provided on a chain link of an upper side link body and a roller provided on a chain link of a lower side link body are adapted to be moved during guide and movement while climbing over each other. Thus, when the energy guide chain has been used for a long period of time, the possibility of breakage due to mutual collision interference between rollers, which cannot be avoided at the climbing over, becomes high. Further, there was a problem that such mutual collision interference between the rollers generates collision noise and collision vibration and these collision noise and collision vibration are further increased in accordance with increased guide and movement speed.

Further, when the projection margin of an exposed roller from the traveling surface for the chain link is decreased or the mount pitch span of the roller on the chain link is lengthened to reduce such collision noise and collision vibration, bending is generated in the upper link body whereby the chain links of the upper side link body and the lower link side are brought into sliding contact with each other. Thus, there was a problem that remarkable wear occurs in its long time use to increase sliding contact resistance, which not only prevents smooth movement of the energy guide chain but also generates wear particles to contaminates surroundings and the conventional energy guide chain cannot be used in clean environment.

Accordingly, the problems to be solved by the present invention, that is the objects of the present invention are to solve the above-mentioned prior art problems and to provide a cable or the like protection and guide device, which can guide and move a cable or the like at high speed and at low noise between a link connection mode where the cable or the like is extended on one side and a link connection mode where the cable or the like is extended on the other side by folding it in a vertical plane of the cable or the like on said one side while centering a fixed end of the cable or the like, and can suppress wear of the link bodies, and in which the maintenance for par's exchanging and the like is easy.

Means for Solving the Problems

The present invention according to claim 1 solves the above-described problems by a cable or the like protection and guide device wherein a number of link bodies each having a rectangular cross-section are articulately connected to each other and a cable or the like is displaced while allowing to be traveled by guide traveling units detachably provided on at least inner peripheral sides of link bodies in a linear mode, in a guide rail provided between a link connecting mode where the cable or the like is extended in one side and a link connecting mode where the cable or the like is extended on the other side by folding it in a vertical plane of the cable or the like on said one side while centering a fixed end of the cable or like characterized in that each of said guide traveling units comprises a slide retainer slidably fitted onto a slide shaft projected from said link body toward a link side, a spring, which biases said slide retainer toward the link side and a traveling roller rotatably retained by said slide retainer, and that any one pair of slide retainers of upper and lower opposed link bodies in said linear mode are biased toward link sides to be pushed out and the other pair of slide retainers abut on the guide rails to be pushed inside the link whereby the traveling rollers of the upper and lower opposed link bodies in said linear mode are traveled so as to pass each other.

And the invention according to claim 2, in addition to the configuration of the invention according to claim 1, a retainer disconnection preventing mechanism is formed between a slide retainer of said guide traveling unit and an inner peripheral side of the link body detachably provided on the guide traveling unit. Thus the above-mentioned problems are further solved.

Further, the invention according to claims 3 or 4, in addition to the configuration of the invention according to claim 1 or claim 2, respectively, the slide retainer of said guide traveling unit is formed of a low friction resin. Thus the above-mentioned problems are further solved.

Effects of the Invention

In the cable or the like protection and guide device of the invention according to claim 1, each of guide traveling units, which displace link bodies in a linear mode in a guide rail provided between a link connecting mode where the cable or the like is extended in one side and a link connecting mode where the cable or the like is extended on the other side by folding it in a vertical plane of the cable or the like on said one side while centering a fixed end of the cable or like, comprises a slide retainer slidably fitted onto a slide shaft projected from said link body toward a link side, a spring, which biases said slide retainer toward the link side and a traveling roller rotatably retained by said slide retainer. Accordingly, any one pair of the respective slide retainers of upper and lower opposed link bodies in said linear mode are biased toward link sides to be pushed out and the other pair of slide retainers abut on the guide rails to be pushed inside the link whereby the traveling rollers of the upper and lower opposed link bodies in said linear mode can be traveled so as to pass each other. Thus the following peculiar effects can be exerted. That is, (1) Since the upper and lower opposed link bodies in a linear mode are traveled to pass each other, damage and collision noise of the traveling rollers due to collision interference of the traveling rollers are not generated unlike a conventional case, and a cable or the like can be moved at high speed and smoothly between a link connecting mode where the cable or the like is extended in one side and a link connecting mode where the cable or the like is extended on the other side by folding it in a vertical plane of the cable or the like on said one side while centering a fixed end of the cable or like.

(2) Since the guide traveling unit is detachably provided on an inner peripheral side of the link body, the traveling roller can be easily exchanged without exploding a chain link and to exchange the roller unlike a conventional case.

And in the cable or the like protection and guide device according to claim 2, in addition to the configuration of the invention according to claim 1, a retainer disconnection preventing mechanism is formed between a slide retainer of said guide traveling unit and an inner peripheral side of the link body detachably provided on the guide traveling unit. Thus, traveling rollers retained by slide retainers biased toward link sides of upper and lower opposed link bodies reliably abut on traveling surfaces formed on the opposed link body without coming off the traveling surfaces so that the upper and lower opposed link bodies can be traveled.

Further, in the cable or the like protection and guide device according to claim 3 and claim 4, in addition to the configuration of the invention according to claim 1 or claim 2, respectively, the slide retainer of said guide traveling unit is formed of a low friction resin. Thus, since wear of the slide retainer can be significantly suppressed even in a long time use, the surroundings are not contaminated by wear particles and the like and the slide retainer can be adopted even under a clean environment.

Figure 1:
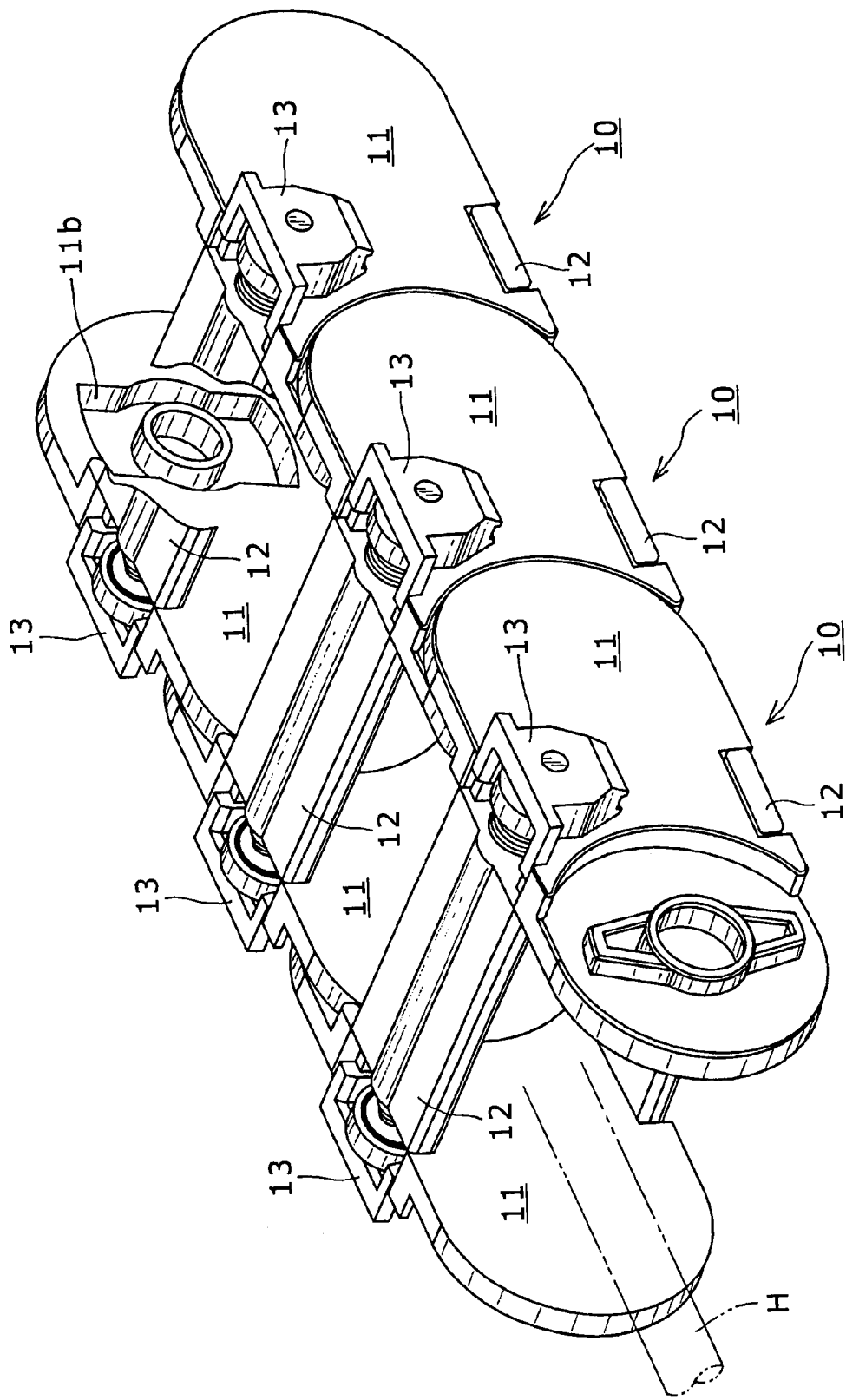
FIG. 1 is a schematic perspective view showing a link connection mode in a cable or the like protection and guide device, which is one example of the present invention.

A better understanding of the DRAWINGS will be had when reference is made to the DESCRIPTION OF THE INVENTION and CLAIMS which follow hereinbelow.

DESCRIPTION OF THE INVENTION

In a cable or the like protection and guide device of the present invention, a number of link plates each having a rectangular cross section are articulately connected to each other, and a cable or the like is adapted to be protected and guided by displacing the cable or the like with guide traveling units each detachably provided in an inner peripheral side of the kink body in a linear mode in a guide rail provided between a link connecting mode where the cable or the like is extended in one side and a link connecting mode where the cable or the like is extended on the other side by folding it in a vertical plane of the cable or the like on said one side while centering a fixed end of the cable or like, while allowing the cable or the like to travel.

And in order to allow the cable or the like to be guided and moved at high speed and low noise between a link connecting mode where the cable or the like is extended in one side and a link connecting mode where the cable or the like is extended on the other side by folding it in a vertical plane of the cable or the like on said one side while centering a fixed end of the cable or like and in order to allow wear of the link bodies to be suppressed, said guide traveling unit comprises a slide retainer slidably fitted onto a slide shaft projected from said link body toward a link side, a spring, which biases said slide retainer toward the link side and a traveling roller rotatably retained by said slide retainer. Accordingly, any one pair of the respective slide retainers of upper and lower opposed link bodies in said linear mode are biased toward link sides to be pushed out and the other pair of slide retainers abut on the guide rails to be pushed inside the link whereby the traveling rollers of the upper and lower opposed link bodies in said linear mode can be traveled so as to pass each other.

It is noted that the link body used in the cable or the like protection and guide device according to the present invention may be composed of any one of a plastic and metal. Particularly, in a case where the link body is composed of a plastic, a connecting pin piece is integrally molded with the link body. However, to further suppress the collision noise due to the connecting pin piece, the link body may be molded in an attachable separate member so that a plastic material suitable for suppression of noise can be selected.

Further, one end side and the other end side of said side plate in the connecting direction of the side plates may include a step form, which does not interfere with each other even if the side plates of adjacent link bodies are overlapped like nesting boxes. However, the thickness of the step is more preferably about half the thickness of the side plate to reliably fit a connecting pin piece projected toward a side of the side plate into a connecting pin hole recessed in the adjacent side plate without bulging out of each other.

EXAMPLE

Figure 2:
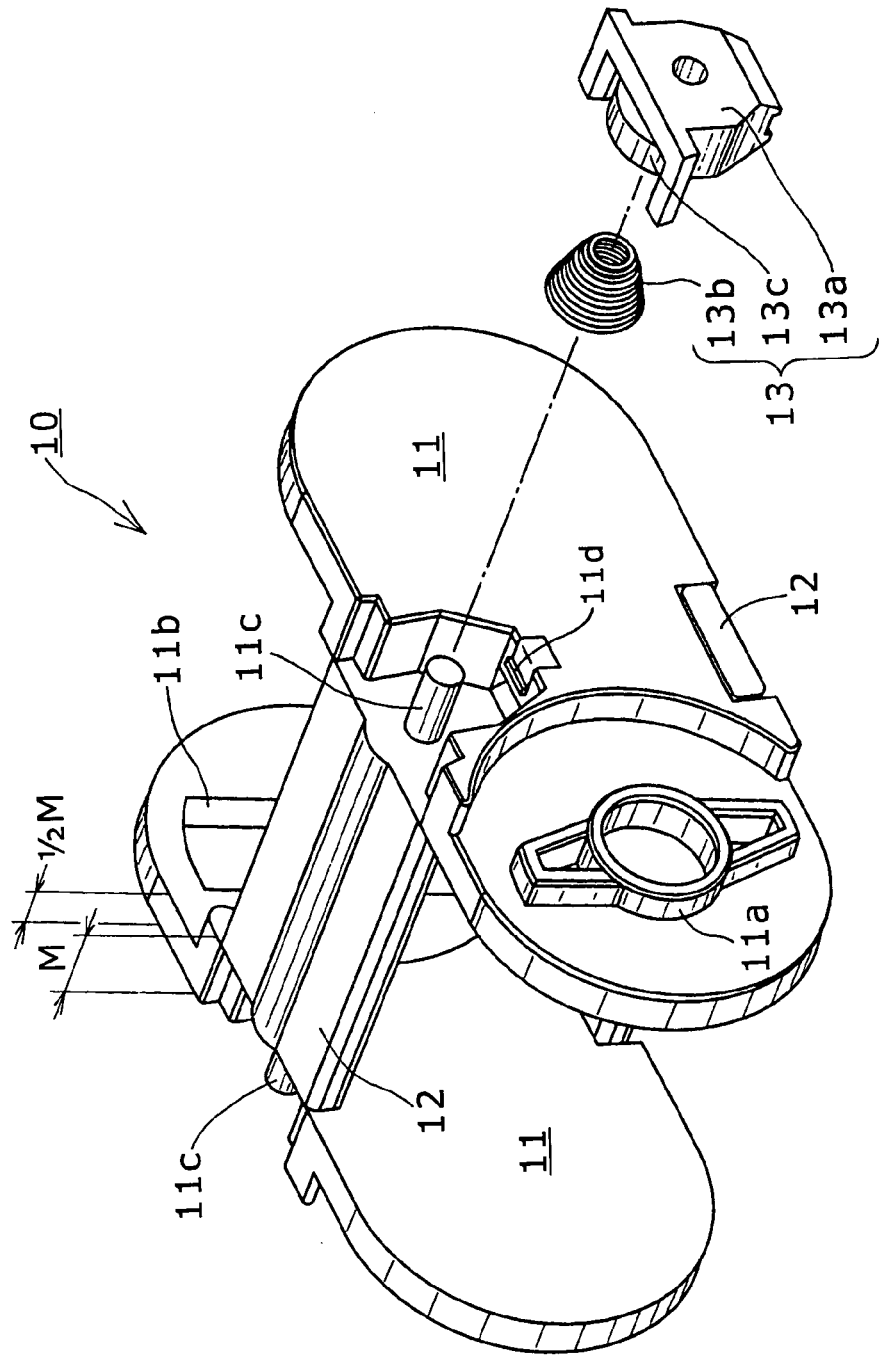
FIG. 2 is an exploded view of a link body shown in FIG. 1.
Figure 3:
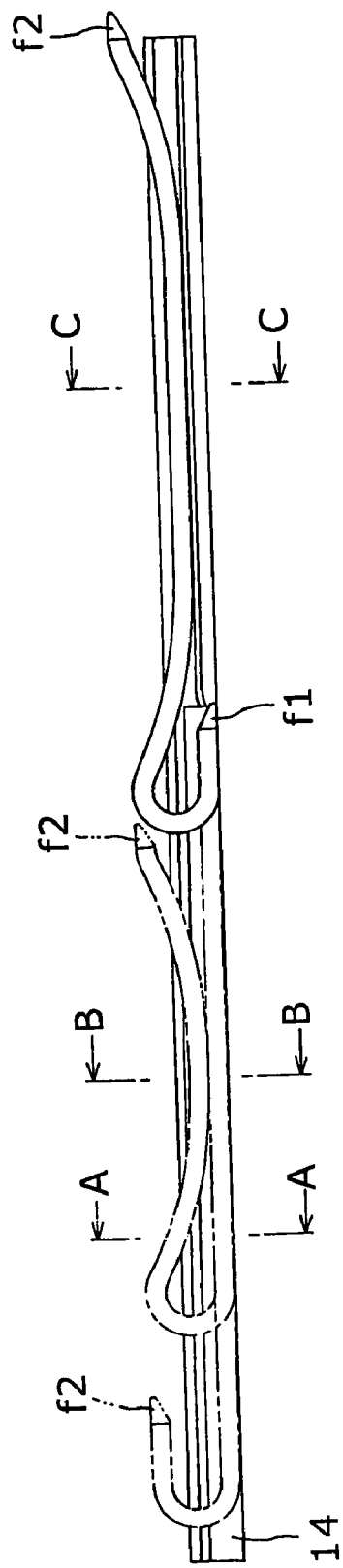
FIG. 3 is a use form showing the cable or the like protection and guide device, which is one example of the present invention.
Figure 4:
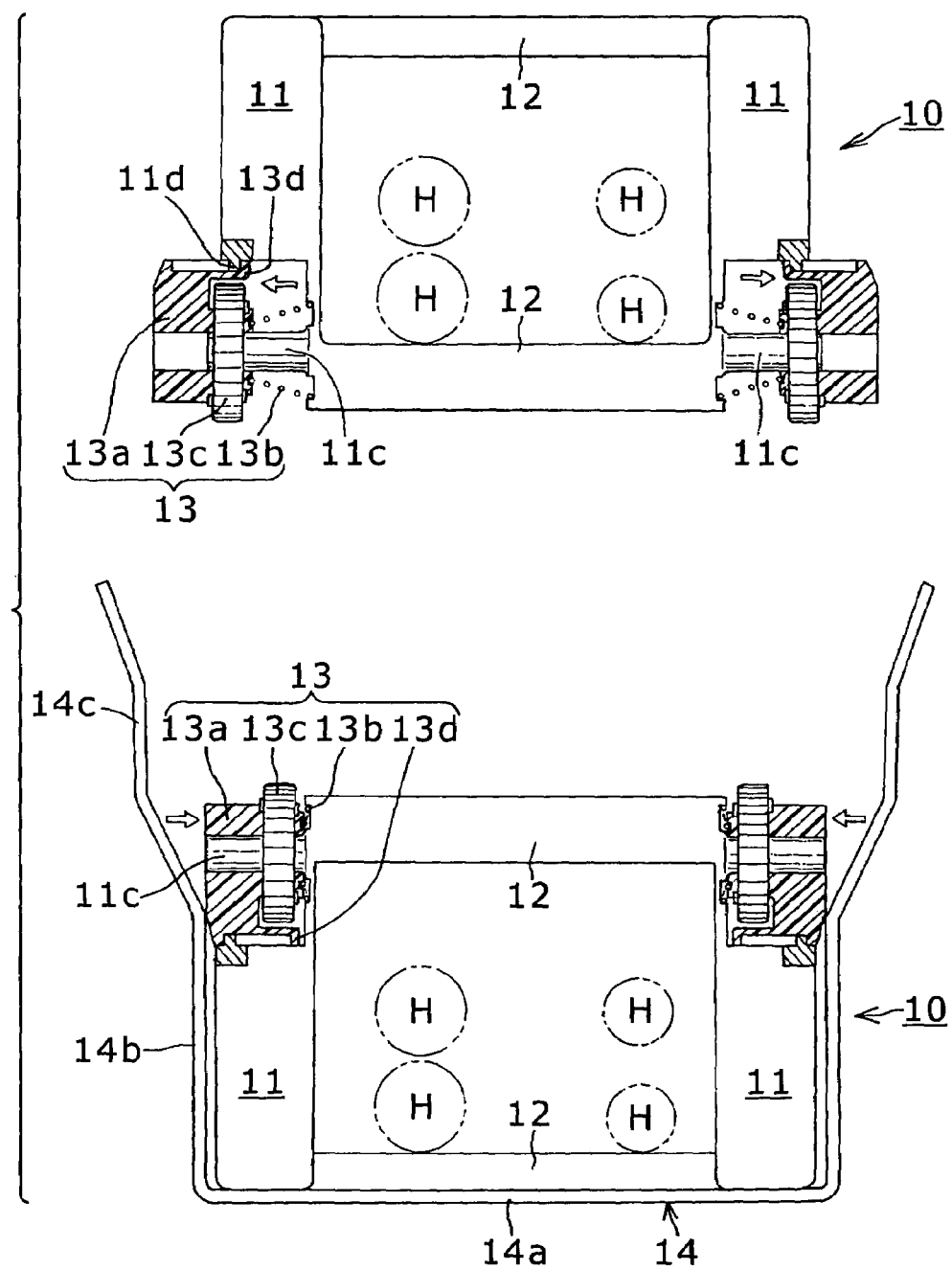
FIG. 4 is an A—A cross-sectional view shown in FIG. 3.
Figure 5:
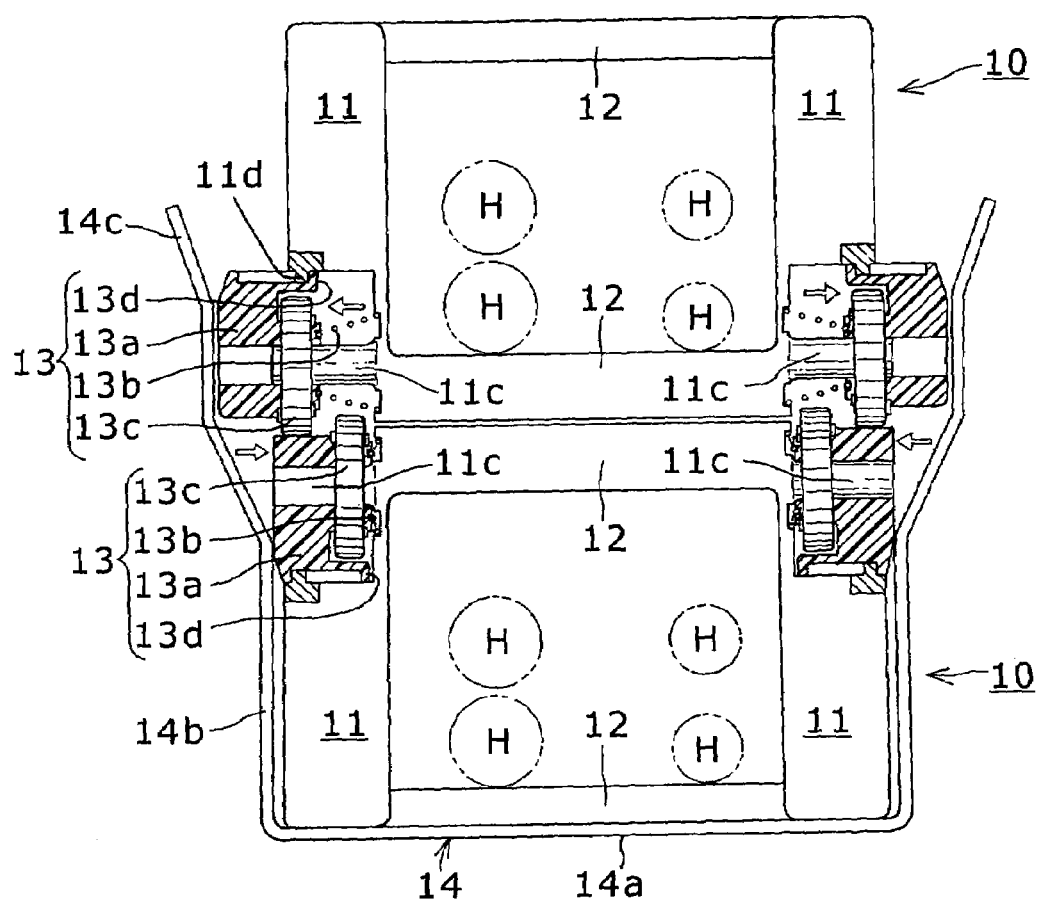
FIG. 5 is a B—B cross-sectional view shown in FIG. 3.
Figure 6:
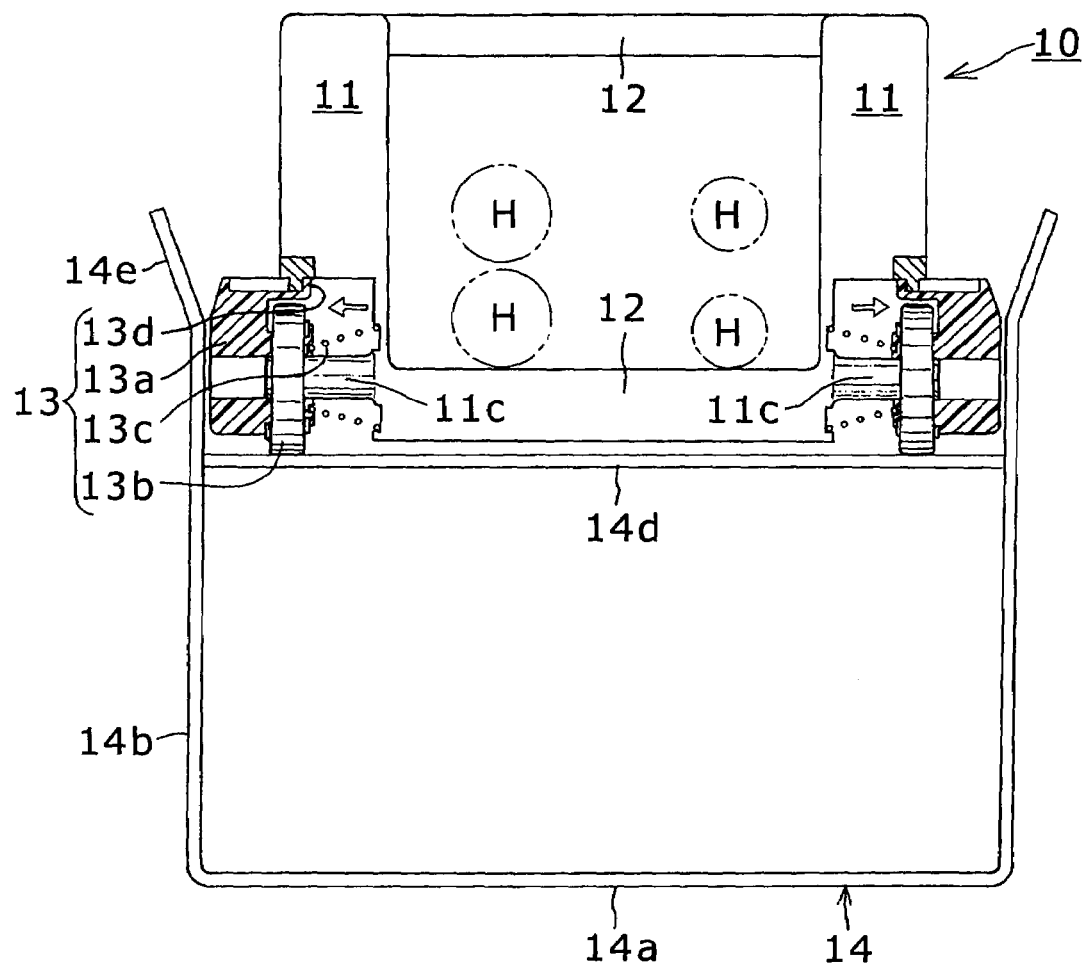
FIG. 6 is a C—C cross-sectional view shown in FIG. 3.

A cable or the like protection and guide device, which is one example of the present invention will be described with reference to drawings. FIG. 1 is a schematic perspective view showing a link's connection state of the cable or the like protection and guide device, which is one example of the present invention, FIG. 2 an exploded view of a link body shown in FIG. 1, FIG. 3 is a use embodiment of the cable or the like protection and guide device, which is one example of the present invention, FIG. 4 is an A—A cross-sectional view shown in FIG. 3, FIG. 5 is a B—B cross-sectional view shown in FIG. 3, and FIG. 6 is a C—C cross-sectional view shown in FIG. 3.

First, to form a cable inserting space in which a cable or the like H such as a cable, a hose or the like, is protected and guided, in a cable or the like protection and guide device of the present example, a number of link bodies 10 each having a rectangular cross-section, molded of a synthetic resin, are articulately connected as shown in FIG. 1. The link plate 10 having the rectangular cross section comprises a pair of side plates 11, 11 oppositely disposed on the left and right side, connecting members 12, 12 laterally bridged across the upper edge center portions and the lower edge center portions respectively. Connecting pin pieces 11 a provided on each one end side of said pair of side plates 11, 11 in a direction of adjacent side plates 11, 11 so as to be projected to both lateral sides perpendicular to the connecting direction and connecting pin holes 11*b* provided on each the other end side of said pair of side plates 11, 11 in a direction of adjacent side plated 11, 11 so as to be recessed to both lateral sides perpendicular to the connecting direction are fitted into each other in the adjacent link bodies.

The one end side and the other end side of said side plate in the connecting direction of the link bodies does not interfere with each other even if the side plates 11, 11 of adjacent link bodies 10, 10 are overlapped like nesting boxes. Further, to reliably fit the connecting pin piece 11*a* provided on a side plate 11 so as to be projected toward a side into the connecting pin hole 11*b* provided in the adjacent side plate 11 so as to be recessed without bulging out of each other a step form of half the plate thickness M of the side plate 11 is adopted. Further, a slide shaft 11*c*, which slidably fit a guide traveling unit 13, described later, is provided inside the side of said side plate 11 so as to be projected to both sides of the link body 10.

Next, a concrete embodiment of a guide traveling unit 13, which is the most characteristic in the cable or the like protection and guide device of the present example, will be explained in detail with reference to FIG. 2.

First, the guide traveling unit 13 in the present example comprises a retainer 13*a* slidably fitted onto a slide shaft 11*c* projected from a side plate 11 of the link body 10 toward a side of a link body, a spring, which biases the slide retainer 13*a* toward a side of the link body 10 and a traveling roller 13*c* rotatably retained on the slide retainer 13*a*.

And since a retainer disconnection preventing mechanism is formed between a locking pawl 13*d* provided on the slide retainer 13*a* of said guide traveling unit 13 and a locking wall 11*d* provided on an inner peripheral side of the link body detachably provided onto the guide traveling unit 13, the traveling roller 13*c* retained on the slide retainer 13*a* biased toward a side of the link body 10 reliably abuts on a traveling surface formed on a facing link body 10 without coming off the traveling surface. The upper and lower opposed link bodies 10, 10 can be traveled. Then the traveling rollers 13*c*, 13*c* of said upper and lower opposed link bodies 10, 10 can travel their traveling surfaces to pass each other.

Further, the slide retainer 13*a* of said guide traveling unit 13 is composed of a low friction resin. Therefore, since wear can be suppressed significantly even if this guide traveling unit 13 is used for a long period of time, the surrounding is not contaminated by wear particles. Thus even in production steps under a clean environment such as semiconductor production steps, food production steps and the like, the slide retainer 13*a* can be adopted.

It is noted that as said low friction resin a composite resin material obtained by a silicone type lubricant- or a fluorine plastic-contained polyacetal resin or the like is used. Particularly, in a case where the silicone type lubricant is contained, it is preferable to contain the lubricant consisting of 0.5 to 2 weight % silicone oil, 0.5 to 2 weight % potassium titanate fiber, and 0.5 to 2 weight % one basic fatty acid ester with respect to the weight of the composite material.

In the thus obtained cable or the like protection and guide device of the present example, cables or the like H can be protected and guided by exhibiting a linear position of a link connection mode extending on one side with respect to a center of a fixed end f1 of the cable or the like and a bending position of a link connection mode extending on the other side while being folded in a vertical plane with respect to the center thereof in a guide rail 14 including a substantially U-shaped rail form as shown in FIGS. 3 to 6. Additionally, the following peculiar action and effect can be obtained.

Namely, while in a movement limiting position shown in FIG. 4, only a number of connected link bodies 10 extending in a lower region of the cable or the like protection and guide device are supported by a U-shaped rail bottom portion 14*a*, and slide retainers 13*a* of the link bodies 10 are pushed inside the link body by rail lower wall portions 14*b*, 14*b*, a stable movement limitation is attained and a number of connected link bodies 10 in the upper region of the cable or the like protection and the guide device are freely released so that a smooth folding action of a moving end f2 of the cable or the like can be performed.

Further, when in a movement limiting position shown in FIG. 5, only a number of connected link bodies 10 extending in a lower region of the cable or the like protection and guide device are supported by a U-shaped rail bottom portion 14*a*, and slide retainers 13*a* of the link bodies 10 abut on rail lower side wall portions 14*b*, 14*b*, a stable movement limitation is attained while automatically pushing the slide retainers 13*a* inside the link bodies. On the other hand, in a number of connected link bodies 10 in the upper region of the cable or the like protection and guide device, while slide retainers 13*a* are biased toward link sides in rail width expanded portions 14*c*, 14*c* expanded from the rail lower side wall portions 14*b*, 14*b* to be pushed out, a stable movement limitation of the number of connected link bodies in the upper region is attained.

Thus, the traveling rollers 13*c* provided in the lower region of the link body 10 and the traveling rollers 13*c* provided in the upper region of the link body 10 reliably abut on the traveling surfaces formed in their facing link bodies 10, 10 without coming off the traveling surfaces whereby the upper and lower opposed link bodies 10, 10 can be traveled.

Further, in a movement limiting position shown in FIG. 6, while only a number of connected and extended link bodies in the upper region of the cable or the like protection and guide device are supported by a rail partitioning shelf portion 14*d*, slide retainers 13*a* are biased toward the link sides in rail upper side wall portions 14*e*, width-expanded at the same degree as said rail width-expanded portion 14*c*, to be pushed out so that a stable movement limitation f2 of the number of connected and extended link bodies 10 in the upper region is attained.

As described above, in the cable or the like protection and guide device of the present example, the traveling rollers 13*c*, 13*c* of upper and lower opposed link bodies 10, 10 in a linear mode travels so as to pass each other, a cable or the like can be moved at high speed and smoothly between a link connection mode extending on one side with respect to a center of a fixed end f1 of the cable and a link connection mode extending on the other side while being folded in a vertical plane of said one side with respect to the center thereof without generating damage and collision noise of the roller due to collision interference of rollers unlike a conventional case. Particularly, in a cable or the like protection and guide device of a long span specification, which attains a remote control movement, traveling resistance is not generated in traveling rollers 13*c*, 13*c* of the upper and lower opposed link bodies 10, 10 in a linear mode unlike a prior art, in which tensile strength, which acts on a moving end f2 of the cable or the like, is liable to be increased. Accordingly, the cable or the like can be smoothly moved at small power in the present example.

Further, in the cable or the like protection and guide device of the present example, since each guide traveling unit 13 is detachably provided on an inner peripheral side of the link body 10, a roller is not exchanged by exploding a chain link unlike the conventional case and the traveling roller 13c can be exchanged easily. Thus the effect of the present invention is very large.

DESCRIPTION OF REFERENCE NUMERALS

10 . . . Link body
11 . . . Side plate
11a . . . Connecting pin piece
11b . . . Connecting pin hole
11c . . . Slide shaft
11d . . . Locking wall
12 . . . Connecting member
13 . . . Guide traveling unit
13a . . . Slide retainer
13b . . . Spring
13c . . . Traveling roller
14 . . . Guide rail
14a . . . Rail bottom portion
14b . . . Rail lower side wall portion
14c . . . Rail width expanded portion
14d . . . Rail partitioning shelf portion
14e . . . Rail upper side wall portion
f1 . . . Fixed end of a cable or the like
f2 . . . Moving end of a cable or the like
C . . . Cable or the like
H . . . Cable or the like
M . . . Plate thickness of the side plate 11

While the invention has been described herein by way of example those skilled in the art will readily recognize that changes and modification may be made to the invention without departing from the spirit and scope of the appended claims.

I claim:

1. A cable protection and guide device wherein a number of link bodies each having a rectangular cross-section are articulately connected to each other; said cable residing substantially within said link bodies; each of said link bodies includes a pair of side plates; each of said side plates includes inner peripheral surfaces; each of said side plates include guide traveling units detachably provided on said inner peripheral surfaces of said side plates of said link bodies; said articulately connected link bodies include a fixed end and a movable end; a guide rail; a first portion of said articulately connected link bodies arranged in a first linear direction being within and engaging said guide rail; a second portion of said articulately connected link bodies are arranged in a second opposite linear direction and do not engage said guide rail; and a third portion of said articulately connected link bodies are arranged in a third curvilinear direction and do not engage said guide rail; said guide traveling units of said link bodies arranged in said first linear direction interengage said guide traveling units of said link bodies arranged in said second linear direction; characterized in that each of said guide traveling units comprises: a slide shaft projected from said inner peripheral surface of said side plate; a slide retainer slidably fitted onto said slide shaft projected from said inner peripheral surface of said side plate of said link body; and, a spring which biases said slide retainer away from said inner peripheral side of said link body and a traveling roller rotatably retained by said slide retainer; and, said slide retainers of said first portion of said guide traveling units arranged in said first linear direction abut said guide rail urging said guide traveling units inwardly toward said inner peripheral surfaces of said side plates of said link body; said slide retainers of said second portion of said guide traveling units arranged in said second linear direction do not engage said guide rail and are biased away from said inner peripheral sides and extend outwardly therefrom; and, said traveling rollers of said first portion of said guide traveling units of said link bodies arranged in said first linear direction being urged inwardly by said abutment of said guide traveling units and said guide rail and said traveling rollers of said second portion of said guide traveling units of said second portion of said link bodies arranged in said second linear direction being urged outwardly by said bias of said springs such that said traveling rollers of said guide traveling units of said first and second portions of link bodies arranged in said first and second linear directions pass each other.

2. The cable protection and guide device according to claim 1, characterized in that said slide retainer includes a disconnection preventing mechanism formed between said slide retainer of said guide traveling unit and said inner peripheral side of said link body.

3. The cable protection and guide device according to claim 1, characterized in that said slide retainer of said guide traveling unit is formed of a low friction resin.

4. The cable protection and guide device according to claim 2, characterized in that said slide retainer of said guide traveling unit is formed of a low friction resin.

* * * * *